United States Patent Office 3,210,165
Patented Oct. 5, 1965

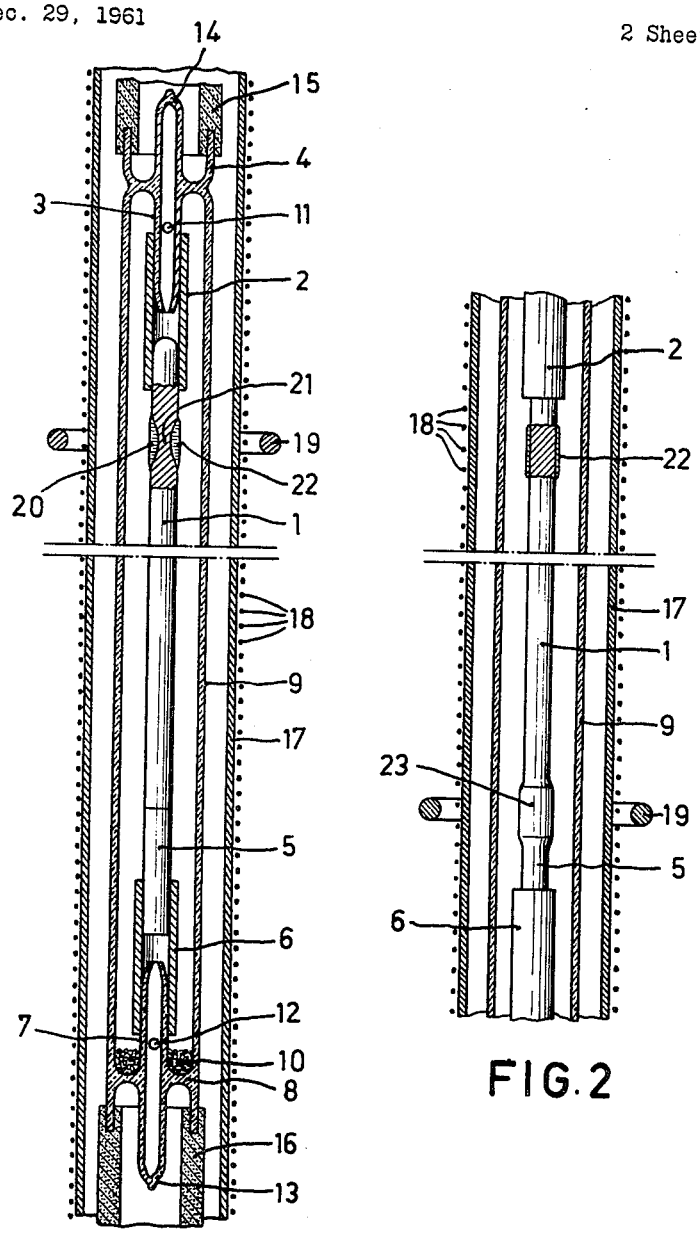

3,210,165
ZONE-MELTING TREATMENT OF SEMICONDUCTIVE MATERIALS
Adrianus Martinus Jacobus Gerardus van Run, Emmasingel, Eindhoven, Netherlands, and Adolf Steinemann, Geneva, Switzerland, assignors to North American Philips Company, Inc., New York, N.Y., a corporation of Delaware
Filed Dec. 29, 1961, Ser. No. 163,252
Claims priority, application Netherlands, Jan. 13, 1961, 260,045
4 Claims. (Cl. 23—301)

The invention relates to a method of subjecting a material to a heat treatment. Such treatments involve the risk that the material absorbs unwanted impurities from the ambiency. Such impurities may dissolve in the material and thus affect adversely the properties of this material or they are liable to react chemically with the material to be treated and thus form little volatile reaction products. The latter may, for example, produce unwanted occlusions in the material or surface layers thereon, which may adversely affect inter alia the structure of the material, for example they prevent the material from forming a monocrystal. Many metals and semi-conductive materials are, for example, capable of reacting with oxygen-containing impurities from the air, originating from gaseous oxygen and water vapour, which can be eliminated only with difficulty from the ambiency of the material. They may also react with gaseous halogen- or sulfur-containing impurities. Some metals may react with gaseous nitrogen- or carbon-containing impurities such as nitrogen and ammonia or volatile hydrogen-carbons respectively, forming insoluble nitrides or carbides respectively.

The invention has for its object inter alia to reduce the adverse effect of these undesired impurities. It is based on the idea of employing the material itself or at least one of its components for binding these impurities at a harmless place. In accordance with the invention, the heat treatment is preceded by heating a quantity of the material itself or of at least one of its components at a temperature at which it binds the ambient impurities, after which a further quantity of the material is subjected to the heat treatment. The impurities thus bound can be prevented from exerting their detrimental action during the heat treatment. The heating may be stopped prior to the beginning of the heat treatment. As an alternative, it may be continued during the heat treatment. The first quantity may be arranged separately from the other quantity, but alternatively, it may, if desired, be removed therefrom afterwards.

The invention is particularly suitable for use in a heat treatment such as the zone melting process applied to an elongated charge of a material. In this case one zone of a material near the end is preferably heated to a temperature such that this material binds the impurities of the ambiency, after which another zone at the other end is heated and conducted through the material. The other heated zone will reach the material with the impurities bound during the first heating process not until it has completely passed through the remainder of the charge. The first zone may then have melted at least partly and, as the case may be, have resolidified before the other heated zone is formed. If the other heated zone has melted, any undesirable impurities already contained in the material are conveyed to the same end where the impurities of the ambiency have been absorbed. Subsequent to the heat treatment this end can be removed from the purified part of the charge. If in the ambiency of the material subjected to the heat treatment use is made of a gas, for example by carrying out this heat treatment in a space filled previously with the gas and/or traversed by the gas during the heat treatment, the impurities contained in this gas may also be eliminated by conveying this gas, prior to its introduction into the ambiency of the quantity of material to be treated, through a heated quantity of the material itself or at least one of its components. If this quantity is in the molten state, the gas may be conducted through the melt.

The invention is particularly suitable for use in heat treatments of semi-conductive compounds, which treatments are usually carried out in closed spaces. Examples of such compounds are: cadmium telluride, lead telluride, lead selenide and lead sulphide. The invention is particularly suitable for use with semi-conductive compounds of the type $A^{III}B^{V}$, which strongly react with oxygen-containing impurities. This applies particularly to those compounds of the said type which contain the elements aluminum or gallium, which elements exhibit a great affinity for oxygen. Examples of those compounds are GaSb, GaAs, GaP, AlSb, AlAs and AlP.

The invention will be described more fully with reference to the accompanying drawing, of which the figures are diagrammatic vertical sectional views of devices for carrying out a zone-melting process.

FIGURE 1 shows apparatus for floating zone melting processes in one phase of the treatment of a material.

FIGURE 2 shows partly the same apparatus in a further phase of the treatment of the material.

Figure 3:
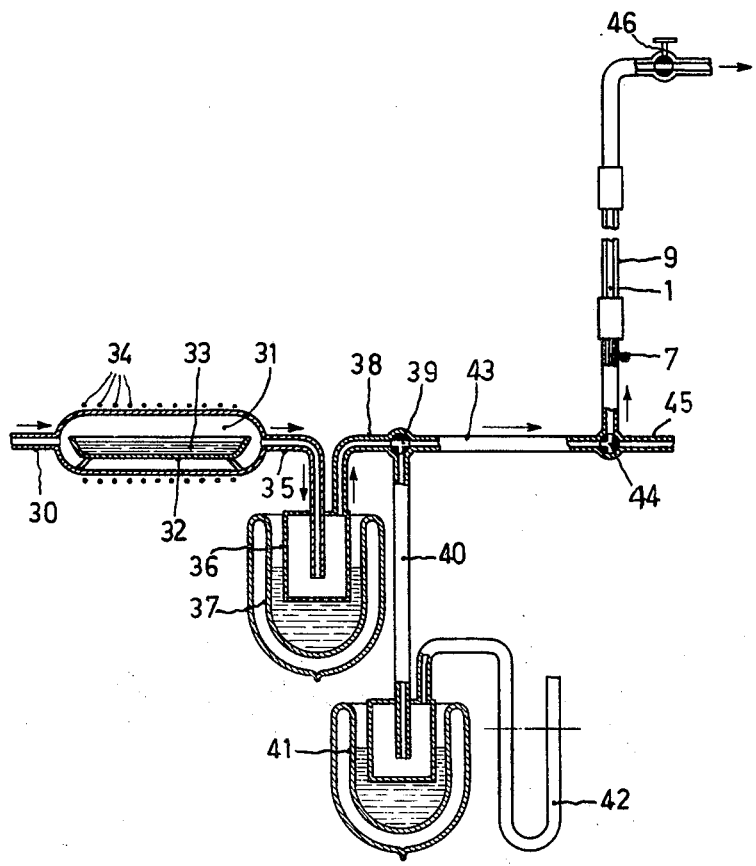
FIGURE 3 shows apparatus for purifying a gas to be employed in zone-melting of a material in the apparatus shown in FIGURES 1 and 2.

Referring to FIGURES 1 and 2, 1 designates a bar of galliumarsenide (GaAs), which is secured by means of a holder 2 of tantalum to a quartz glass tube 3, provided with a quartz glass collar 4 sealed thereto.

A bar-shaped seed crystal 5 of galliumarsenide is secured by means of a holder 6 to tantalum to a quartz glass tube 7, which is sealed at 8 in one end of a quartz glass tube 9. At the seal 8 a small quantity of arsenic 10 is provided in a granular or powdery form inside the tube. The bar 1 and the seed crystal 5 are arranged one against the other and aligned, and at the other end the tube 9 is sealed to a collar 4. With the aid of the tubes 3 and 7, which are provided with openings 11 and 12 respectively in the side walls, the desired gas filling may be provided in the interior of the tube 9. In the present case the tube 7 is preliminarily sealed at 13 and the space inside the tube 9 is exhausted via the tube 3, after which this tube is sealed at 14, so that the bar 1 is enclosed in a closed space.

The tube 9 is accommodated in a vertical position within a wider vertical quartz-glass tube 17, of at least twice the length of the former and is supported at the top and at the bottom end by two supports 15 and 16 respectively of graphite. The assembly formed by the tube 9 and the holders 15 and 16 can be displaced vertically with respect to the tube 17 by means of a mechanism (not shown).

The tube 17 is surrounded by a resistance wire 18, which is connected to a variable voltage source (not shown). The tube 17 is furthermore surrounded by a high-frequency coil 19, which can be energized by a high-frequency generator (not shown).

The tube 9 is arranged at such a level inside the tube 17 that the high-frequency coil 19 surrounds part of the bar 1 at the top end thereof (see FIGURE 1). By energizing the resistance wire 18 the tube 19 is heated as a whole at a temperature of 610° C. The arsenic 10 is thus partly evaporated, so that inside the tube 9 arsenic vapour of approximately atmospheric pressure is obtained.

Then the high-frequency coil 19 is energized such that an annular molten zone 20 is formed around a solid core 21 of the bar 1. The heated galliumarsenide of the molten zone 20 reacts with gas residues in the tube 9 containing oxygen, for example with molecular oxygen and water vapour, while galliumoxide is formed which forms a solid layer 22 on the zone 20. These oxygen-containing gas residues may be already present, at least partly, in the atmosphere inside the tube 9 in the form of impurities before filling with the gas; they may at least partly be present in the filling gas as minor impurities. Any arsenic oxide vapour formed by the reaction of the arsenic with the gas residues is decomposed by the reaction with the molten material of the zone 20, so that the oxygen is also bound in the form of solid gallium oxide. The annular molten zone 20 is maintained for about half an hour, after which the surroundings of the galliumarsenide are sufficiently free of oxygen residues to avoid a further troublesome formation of galliumoxide. Any other impurities from the surroundings may be absorbed by the heated galliumarsenide. The available arsenic vapour prevents the heated galliumarsenide from disassociating.

The energization of the high-frequency coil is then reduced so that the zone 20 solidifies. The tube 9 is then displaced upwards to an extent such that the contact area between the bar 1 and the seed crystal 5 lies inside the coil 19. The coil 19 is then energized so that the bar 1 and the seed crystal 5 are sealed together and a molten zone 23 is produced throughout the bar diameter, this zone being bound below by the solid monocrystalline material of the seed crystal 5 and above by the solid material of the bar 1 (see FIGURE 2). This zone 23 is not coated with an oxide layer.

The tube 9 is then moved downwards at a rate of 0.5 mm. a minute, so that the molten zone 23 travels gradually in the direction towards the top end of the bar 1 through the material. The material of the bar 1 melts gradually and the seed crystal 5 grows gradually to form a monocrystal. The displacement is continued until the top part of the bar 1 with the oxide layer 22 is reached by the molten zone 23, after which the high-frequency current of the coil 19 is switched off, so that the zone 23 solidifies. Then also the current through the resistance wire 18 is switched off and the assembly is allowed to cool.

After the tube 9 has been opened and the galliumarsenide bar has been taken out the end having the oxide layer 22 can be cut off. Thus a bar of galliumarsenide is obtained, which consists of a single crystal.

If, in accordance with methods known per se, heating at the top end of the bar 1 to form the annular zone 20 is omitted, it is found that, in general, a seal between the seed crystal 5 and the bar 1 can be obtained only with great difficulty. During the subsequent displacement of the zone 23 the part solidifying after this zone becomes polycrystalline. Instead of the vacuum of the tube 9, a hydrogen atmosphere may be provided in the tube 9 prior to the sealing of the tubes 3 and 7. The hydrogen is caused to pass first through a quantity of heated gallium, which will be explained more fully with reference to the diagram of FIGURE 3.

A flow of hydrogen gas, which has been purified in advance in known manner, passes through a duct 30 to a tubular vessel 31, in which a boat 32 filled with a quantity of gallium 33 is arranged. The vessel 31 is heated by means of a resistance wire 34, which is wound around the vessel 31. The gallium is in the molten state and absorbs impurities from the hydrogen, particularly oxygen and forms galliumoxide. The hydrogen is conveyed through the duct 35 through a vessel 36, which is cooled by liquid air in a Dewar vessel 37, after which it passes via the duct 38 towards a three-way cock 39, which communicates on the one hand via the duct 40 and a liquid-air vessel 41 with a manometer 42 and on the other hand with a duct 43, which conducts towards a second three way cock 44. This cock communicates on the one hand via a duct 45 with a suction pump (not shown) and on the other hand with the tube 7, so that the hydrogen is conducted through the tube 9 and from this tube via the tube 3 (cf. FIGURE 1) via the cock 46 it is conducted away. The purified hydrogen expells the air from the tube 9 so that the galliumarsenide bar 1 is in surroundings of purified hydrogen. The three-way cock 44 is adjusted so that the duct 45 does not communicate with the ducts 43 and the tube 9. After the hydrogen supply via the duct 30 has terminated, the cock 46 is closed and the cock 39 is adjusted so that the duct 38 no longer communicates with the ducts 43 and 40. The tube 3 is then sealed.

Subsequently, the three-way cock 44 is adjusted so that hydrogen from the tube 9 is pumped away until the pressure has dropped to about 100 mms. Hg, which pressure can be read from the manometer 42. The tube 7 can then be sealed and the heat treatment referred to above of the galliumarsenide in the tube 9 can be carried out. This galliumarsenide is thus in hydrogen-containing surroundings, this hydrogen being purified by passing it over heated gallium. The heating in forming the molten annular zone 20 can be dispensed with in this case, the air being expelled by the current of hydrogen purified by the treatment with molten gallium.

Although the formation of a monocrystal of galliumarsenide is described above, the invention is not restricted to this embodiment. It may also be applied to the purification of material, while, for example, a molten zone is passed several times through the material. The invention is furthermore not restricted to the use with galliumarsenide or further compounds of the type $A^{III}B^{V}$. It may be applied to the other semi-conductive compounds and even to germanium and silicon. The invention may furthermore be employed with materials not being semi-conductive, for example with metals and alloys.

Figure 4:
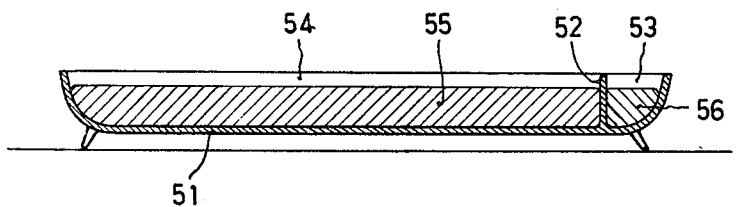
FIGURE 4 shows an elongated crucible for use in a zone-melting process.

The invention is neither restricted to the preliminary heating of a bar end. With the heat treatment of a quantity of material a separate quantity of the same material may, as an alternative, be preheated instead. For example zone-melting may be carried out with a material in a crucible of the kind shown in FIGURE 4, in which 51 designates an elongated crucible, which has, at one of its ends, a partition 52, which separates a small portion 53 from the remaining portion 54 of the crucible. In the portion 54 a quantity of the material 55 may be arranged and subjected to a heat treatment, for example, a zone-melting process. In the portion 53 a smaller quantity 56 of the same material may be arranged. This quantity 56 may then be heated, prior to the heat treatment of the quantity of material 55, to such a temperature that it absorbs the impurities from the surroundings.

Instead of using one partition, two partitions may be used with a given intermediate space in order to provide a larger distance between the two quantities 55 and 56, so that heating of part of the quantity 55 during the heating of the quantity 56 can be avoided.

The invention is not restricted to zone-melting processes. With other heat treatments, for example in drawing crystals from a melt, sealing together of bodies of the same material and sintering processes the invention may be employed.

What is claimed is:
1. A method of zone-melting a semiconductive material in a closed environment in which may be present undesirable impurities which tend to combine with the semi-conductive material when the latter is melted, comprising providing in the said closed environment a quantity of said material to be subjected to the said zone-melting in the form of an elongated charge, first melting a zone of the charge confined to one end of the charge so that combination with the undesirable impurities occurs until the said undesirable impurities in the environment are tied up substantially only in said one end of the charge, terminating the first melting of the zone at said one end, and thereafter forming in the end of the charge opposite to said one end a second molten zone and causing the second molten zone to traverse the charge toward the said one end enabling the latter zone-melting to be carried out in an environment substantially freed of the said undesirable impurities by the melting of the first zone.

2. A method as set forth in claim 1 wherein the first melted zone is an annular zone.

3. A method of zone-melting a semiconductive material in a closed environment in which may be present undesirable impurities which tend to combine with the semiconductive material when the latter is melted, comprising providing in the said closed environment a quantity of said material to be subjected to the said zone-melting in the form of an elongated charge, disposing adjacent one end of the charge a seed crystal, first melting a zone of the charge confined to the end of the charge opposite to said one end so that combination with the undesirable impurities occurs until the said undesirable impurities in the enviornment are tied up substantially only in said opposite end of the charge, terminating the first melting of the zone at said opposite end, and thereafter forming in the end of the charge at said one end and encompassing the adjacent seed crystal portion a second molten zone and causing the second molten zone to traverse the charge toward the said opposite end enabling the latter zone-melting and monocrystal growth to be carried out in an environment substantially freed of the said undesirable impurities by the melting of the first zone.

4. A method of zone-melting a semiconductive material in a closed environment in which may be present undesirable impurities which tend to combine with at least a constituent of the semiconductive material when the latter is melted, comprising providing in the said closed environment in a first crucible region a quantity of said material to be subjected to the said zone-melting in the form of an elongated charge and also providing in a second crucible region separated from the first region one of (a) another quantity of said material, and (b) a quantity of the said constituent of said material with which the undesirable impurities tend to combine, first melting a portion of the material confined to said second crucible region so that combination with the undesirable impurities occurs until the said undesirable impurities in the environment are tied up substantially only in the material in said second crucible region, terminating the first melting of the material in said second crucible region, and thereafter forming in an end of the charge in said first crucible region a second molten zone and causing the second molten zone to traverse the charge only in said first crucible region enabling the latter zone-melting to be carried out in an environment substantially freed of the said undesirable impurities by the first melting of the material of said second crucible region.

References Cited by the Examiner

UNITED STATES PATENTS

| 2,855,335 | 10/58 | Seiler | 23—301 |
| 2,876,147 | 3/59 | Kniepkamp et al. | 148—1.5 |
| 3,092,462 | 6/63 | Goorissen | 23—301 X |

OTHER REFERENCES

Lawson et al.: The Preparation of Single Crystals, pages 91–92, 105–106, 1958.

Neilson et al.: Review of Scientific Ins., vol. 25, #6, June 1954, pages 596 to 598.

Marshall et al.: Journal of Sci. Instruments, vol. 35, April 1958, pages 121 to 125.

Growth of Gallium Arsenide by Horizontal Zone Melting, by J. L. Richards, Journal of Applied Physics, vol. 31, No. 4, March 1960, pages 600 to 603.

Semi-Conductors, by Hannay, Reinhold Pub. Corp., New York, Feb. 27, 1959, pages 121, 122, 412 and 413.

NORMAN YUDKOFF, *Primary Examiner.*

ANTHONY SCIAMANNA, *Examiner.*